United States Patent [19]

Inoue et al.

[11] Patent Number: 4,822,236

[45] Date of Patent: Apr. 18, 1989

[54] APPARATUS FOR BOOKING AN ELASTOMER ARTICLE

[75] Inventors: Seizaburo Inoue; Glenn D. Ryans, both of Nashville, Tenn.

[73] Assignees: Bridgestone Corporation, Tokyo, Japan; Bridgestone (U.S.A.), Inc., La Vergne, Tenn.

[21] Appl. No.: 838,730

[22] Filed: Mar. 11, 1986

[51] Int. Cl.⁴ ............................................. B65G 47/34
[52] U.S. Cl. .................................. 414/591; 198/468.4; 294/65; 414/399; 414/626; 414/627; 414/752
[58] Field of Search ................. 414/591, 626, 71, 399, 414/627, 72, 225, 752, 744 B, 737, 752; 294/64.1, 65; 901/40, 7; 198/468.4

[56] References Cited

U.S. PATENT DOCUMENTS

| 3,033,381 | 5/1962 | Noble et al. | 414/626 X |
| 3,090,502 | 5/1963 | Gunzelmann | 414/626 X |
| 3,901,392 | 8/1975 | Streckert | 414/71 |
| 3,902,594 | 9/1975 | Schmitt | 414/591 X |
| 3,964,953 | 6/1976 | Mitchard et al. | 294/64.1 X |
| 4,200,420 | 4/1980 | Cathers et al. | 414/72 X |
| 4,582,191 | 4/1986 | Weigand | 414/744 B |

FOREIGN PATENT DOCUMENTS 1914437  11/1969  Fed. Rep. of Germany ...... 414/737

Primary Examiner—Frank E. Werner
Attorney, Agent, or Firm—Sughrue, Mion, Zinn, Macpeak, and Seas

[57] ABSTRACT

Apparatus for booking an elastomer such as a rubber sheet is disclosed. A conveyor has a series of driven rollers. A stop member is positioned to stop the movement of the elastomer by contacting the front end. The stop member may be fixed on a transfer or grasp member, typically a vacuum head which is employed to transfer the elastomer on to a flatcar.

9 Claims, 3 Drawing Sheets

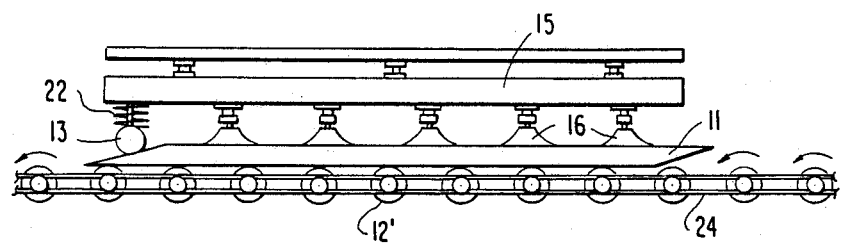
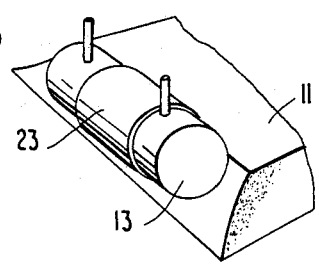
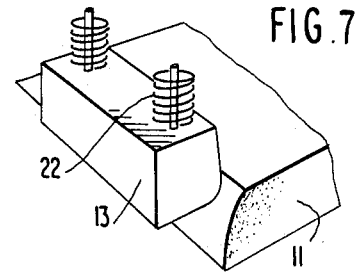
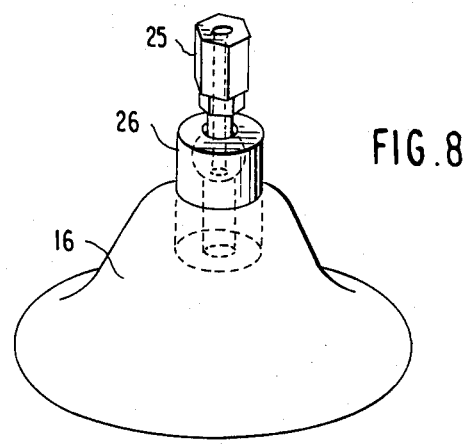
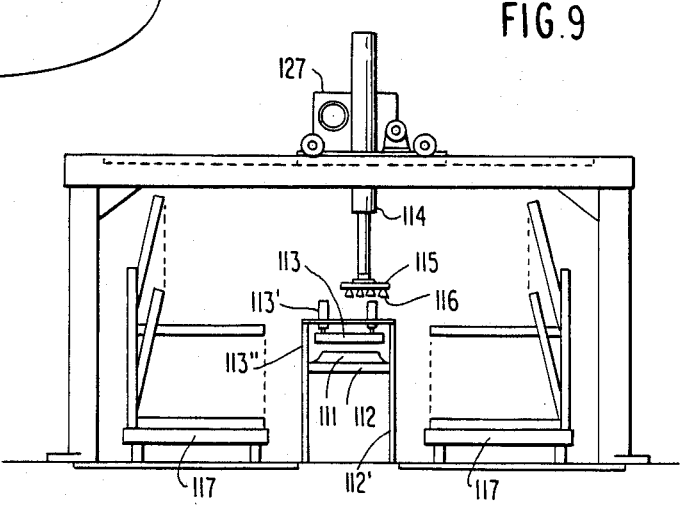

APPARATUS FOR BOOKING AN ELASTOMER ARTICLE

FIELD OF THE INVENTION

The present invention relates to an apparatus of booking an elastomer article such as extruded rubber products for new tires and retreaded tires.

BACKGROUND OF THE INVENTION

In a tire building process, a multiplicity of rubber components made of unvulcanized rubber compositions are used to produce uncured or green tires. Extrusion is an economical and widely used method for forming unvulcanized extruded components such as green tread strips, green sidewall strips and green stiffener strips. Therefore, booking operations in an extrusion process are labor intensive because of the great number of extruded rubber components.

An automatic apparatus for booking an elastomer article has been proposed as illustrated in FIG. 1 and FIG. 2. As used in this description a typical elastomer article is a rubber component for a tire. It is understood that the system is not limited to such articles. In Figure. 1, a rubber article 1 is carried with a main conveyor 2. When the rubber component reaches a rest position on the main conveyor 2, a side conveyor 3 automatically ascends swiftly over the main conveyor 2 and carries the rubber article 1 to waiting conveyors 4 positioned on either side of the main conveyor. In this apparatus, the said conveyor 3 has two functions: (a) stopping the rubber article 1 on the main conveyor 2 and (b) carrying the rubber article to the transfer conveyor 4. Thereafter, a vacuum 5 for latching on a rubber article holds the rubber article 1 and together with means 6 transfers the rubber article 1 with the vacuum 5 to a flat car 7.

FIG. 2 illustrates, in a detailed schematic, the main conveyor 2, the side conveyor 3 and the transfer conveyor 4. Since this apparatus needs a transfer conveyor, it requires not only a large working area but also high constructions costs. Therefore, such a system has not achieved wide acceptance. A need exists for a booking system that does not require the extensive equipment and space requirements of prior art devices.

SUMMARY OF THE INVENTION

An object of the present invention is to provide an improved system for booking an elastomer article on a flatcar in order to save space and reduce the expense of construction.

The present invention provides such an improved system.

The system comprises a conveyor, means for stopping an elastomer article on a conveyor, means for grabbing the stopped elastomer article and means for transferring the grabbed elastomer article to a flatcar. The conveyor has a multiplicity of rollers connected with a drive means. The stop means touches the elastomer article on a front portion in order to stop the elastomer article and position it for transfer. The means for grabbing is preferably a vacuum head which has a plurality of vacuum nozzles.

BRIEF DESCRIPTION OF THE DRAWINGS

FIG. 5 is a side view of the embodiment of FIG. 4;

FIG. 6 is a perspective view of a stop means of the present invention;

FIG. 7 is a second perspective view of a stop means of the present invention;

FIG. 8 is a perspective view of a vacuum head of the present invention; and

FIG. 9 is a side elevational view of a second embodiment of an apparatus according to the present invention.

DETAILED DESCRIPTION OF THE INVENTION

The apparatus and the method forming the system of the present invention will now be described in detail with reference to the drawings.

Figure 1:
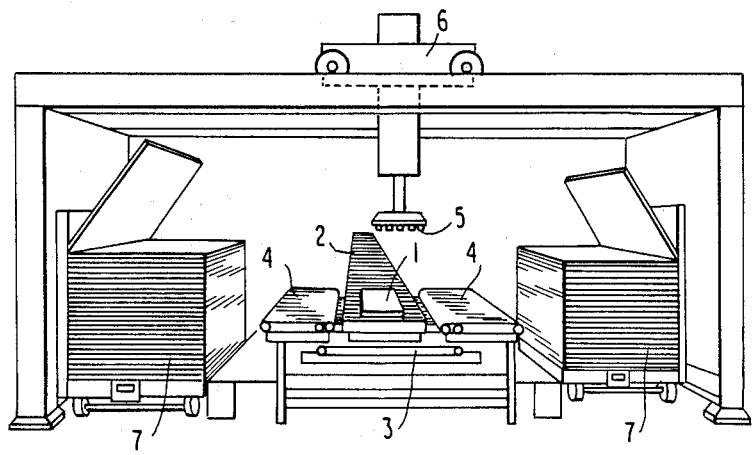
FIG. 1 is a perspective view of the apparatus of a prior art system using a side conveyor and a transfer conveyor.
Figure 2:
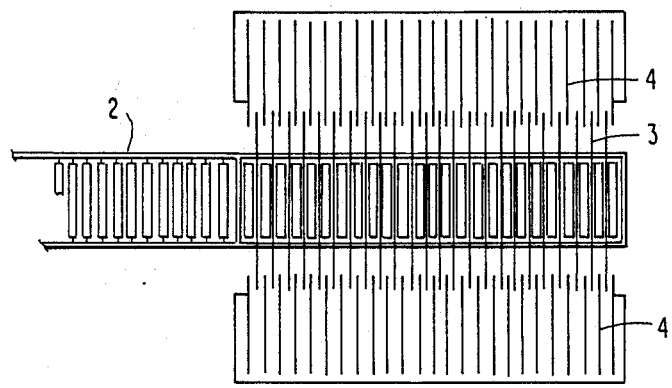
FIG. 2 is a detailed top plan view of the conveyors of the prior art system.
Figure 3:
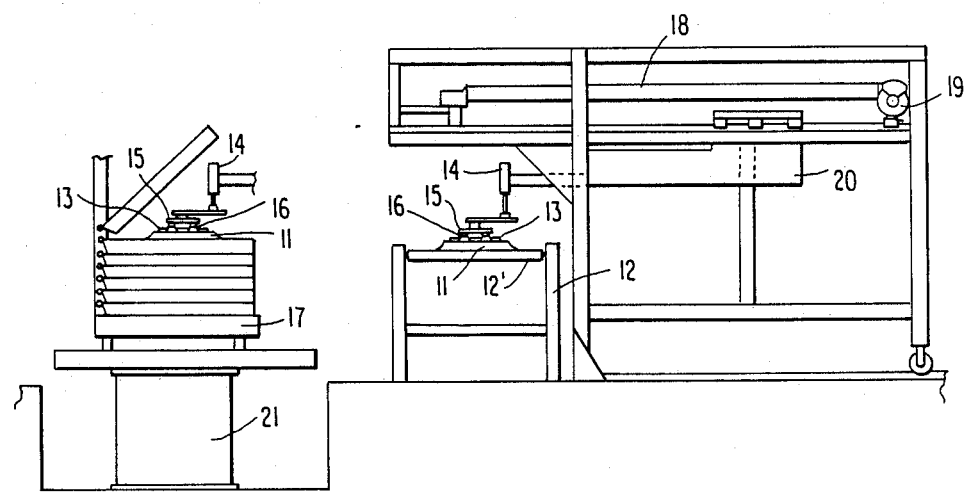
FIG. 3 is a side elevational view of a preferred embodiment of the system according to the present invention.

FIG. 3 illustrates a first preferred embodiment of the apparatus. An elastomer article 11 such as a green tread strip and a green sidewall strip moves on a conveyor 12. A sensor 30 such as a photocell is used to detect the front edge or head point of the elastomer article 11 on the conveyor 12 relative to the stopper 13 for the rubber article 11. A timer (not illustrated) works with the sensor. A cylinder 14 such as an air pressure cylinder and a hydraulic cylinder, lowers the stop means 13 fixed on means 15 for grabbing the rubber article 11 to stop the rubber article 11. The conveyor 12 has a multiplicity of rollers 12' connected with a drive means such as a motor. Some of the rollers 12' can idly rotate. Therefore, the rubber article 11 can stop on the conveyor. When the stop means descend, the vacuum system 15 having vacuum head 16 begins to work simultaneously. The vacuum head 16 contacts and holds the rubber article 11 just after the stop means touches the rubber article 11 on the front part. It is preferred that the vacuum means 15 press and hold a rubber article on the conveyor 12 with its vacuum heads for 0.1–1.0 second, more preferably for 0.2–0.5 second before transferring the rubber article 11 to a flatcar 17. This small time interval ensures that the rubbery article 11 is positively coupled to the vacuum head. The assembly for transferring the rubber article to the flatcar comprises a cylinder 14 for vertical movement, a cylinder 18 for horizontal motion, which may be an air pressure cylinder or a hydraulic cylinder, an encoder 19 and a support 20. The cylinder 18 is initiated just after the cylinder 14 lifts the vacuum head 15. The motion of the cylinder 18 transfers the rubber article 11 to the flatcar 17. In this embodiment, the flatcar 17 is lifted or lowered by an elevator 21.

Figure 4:
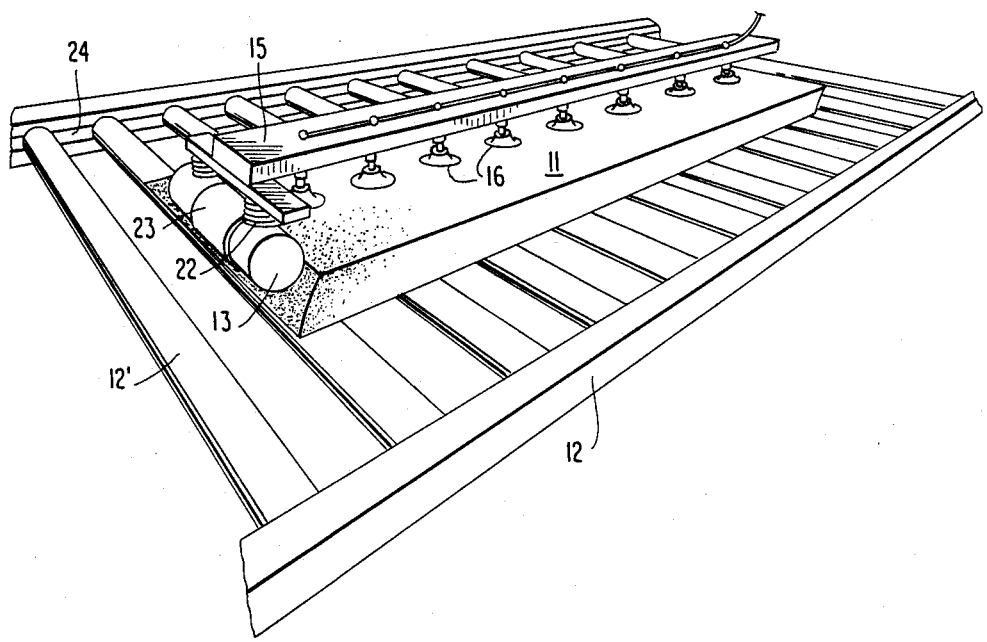
FIG. 4 is a perspective view of a stop means and a grabbing means of the present invention.

FIG. 4 illustrates a perspective view of the stop means 13 and the vacuum head 15 of the present invention. It is preferred that a spring 22 be interposed between the stop means 13 and the vacuum head 14 to bias the head upward and reduce the pressure on the front portion of the rubber article 11.

Splice cement is usually applied to the front or back part of the rubber article 11. When the splice cement is easily exfoliated or the rubber article 11 is easily deformed, it is preferred that the stop means 13 have a rotatable cylinder 23 which contacts with the front part of the rubber article 11. The rotatable cylinder is mounted on the stop means 13 and prevents the rubber article from compressing between the stop means and the conveyor.

If the rubber article 11 is a green tread strip for a truck, a bus and a passenger car, it is usually sufficient to have a single line of vacuum head 16 coupled to a manifold for the vacuum means 15. If the rubber article 11 is a larger size or a green sidewall strip, it is preferred for the vacuum means 15 to have plural lines of vacuum heads 16. This ensures that sufficient suction for it will be available to lift the rubber article. It is to be understood that optimization of the vacuum head can be achieved in a variety of ways.

Each roller 12 is connected with a drive means through a transmission member 24 such as a belt and a chain.

FIG. 5 illustrates a side view of the vacuum means 15. The rollers 12' on which the rubber article 11 stops are idle running rollers.

FIGS. 6 and 7 show further embodiments of the stop means 13. In FIG. 6, the stop means 13 is directly fixed on the vacuum means 15. The stop means 13 has a round shape. The cylindrical sleeve 23 is mounted thereon. In FIG. 7, the stop means 13 is rounded off at the corner touching the rubber article 11 on the front portion. In this embodiment the stop means is resiliently mounted by means of springs 22.

FIG. 8 illustrates a suitable embodiment of a vacuum head 16. A coupling 25 has a ball joint in a portion 26. The coupling 25 has a hexagonal union to lock into the manifold. Either portion 24 or 25 is made of metal or plastic. Better results are obtained in use when the vacuum heads 16 are pivotable to accommodate variations in the surface characteristics of the article to be transported.

FIG. 9 shows a second preferred embodiment of the present invention, which differs from the first embodiment in having stop means 113 located on a conveyor 112 not carried by the grasp means 115. The stop means 113 is carried up and down by a cylinder 113', such as an air pressure cylinder and a hydraulic cylinder. The stop means 113 and the grasp means 115 are activated by a sensor not shown that senses the passage of an elastomer article 111 on a conveyor 112 mounted on a frame 112' and a controller not illustrated. A frame 113" which mounts the stop means 113 is vertically movable to permit elastomer articles of different sizes to pass under. The grasp means 115 has four lines of vacuum heads 116. A cylinder 114 is employed to move the grasp means 115 vertically and may be an air pressure cylinder or a hydraulic cylinder. A carriage 127 is used for moving the cylinder 114 horizontally in either direction to a flatcar 117. The carriage comprises a drive means such as a motor, wheels, rails and a transmission member such as a belt or a chain.

As mentioned above, according to the present invention, booking a rubber article on a flatcar is carried out without a side conveyor and a waiting conveyor.

What is claimed:

1. An apparatus for booking an elastomer article on a flatcar, comprising;
   (a) a conveyor having a multiplicity of rollers connected with a drive means,
   (b) means for stopping said elastomer article on said conveyor by contacting said elastomer article on the front portion,
   (c) means for grasping said stopped elastomer article having a plurality of vacuum heads,
   (d) a spring interposed between said means for stopping and said means for grasping;
   (e) means for transferring said grasped elastomer article to the flatcar, and said stop means fixed on said grasp means.

2. The apparatus of claim 1, wherein said stop means is rounded off at the line of contacting said elastomer article on the front portion.

3. The apparatus of claim 1, wherein said stop means have a round shape.

4. The apparatus of claim 1, wherein said stop means comprises a rotatable cylinder which contacts with said elastomer article.

5. The apparatus of claim 1, wherein said grasp means comprise plural lines of vacuum heads.

6. The apparatus of claim 1, wherein said grasp means comprises a single line of vacuum heads.

7. The apparatus of claims 5 or 6, wherein the vacuum heads are rotatable.

8. The apparatus of claim 1, further comprising means for detecting the position of the head point of said elastomer article on said conveyor before stopping said elastomer article.

9. The apparatus of claim 1, wherein said grasp means hold said elastomer article on said conveyor with said vacuum heads for 0.1–1.0 second before transferring said elastomer article to the flatcar.

* * * * *